United States Patent [19]

Strand

[11] Patent Number: 4,768,562

[45] Date of Patent: Sep. 6, 1988

[54] PIPE LINER

[75] Inventor: Norman S. Strand, Midland, Mich.

[73] Assignee: Insta-Pipe Research Limited Partnership, Troy, Mich.

[21] Appl. No.: 61,584

[22] Filed: Jun. 15, 1987

[51] Int. Cl.[4] .............................................. F16L 55/16
[52] U.S. Cl. ..................................................... 138/98
[58] Field of Search .................. 138/97, 98, 153, 178; 174/DIG. 8; 428/36, 90

[56] References Cited

U.S. PATENT DOCUMENTS 3,726,817 4/1973 Niswonger ........................ 428/90 X
4,009,063 2/1977 Wood ................................ 138/97 X
4,233,101 11/1980 Scragg et al. .................... 138/140 X
4,456,401 6/1984 Williams ........................... 138/97 X
4,532,164 7/1985 Claunch, II et al. ......... 174/DIG. 8
4,600,615 7/1986 Hyodo et al. ..................... 138/97 X
4,639,545 1/1987 Pithouse et al. .............. 174/DIG. 8

FOREIGN PATENT DOCUMENTS 106924 8/1979 Japan ..................................... 138/97

Primary Examiner—Mark J. Thronson
Attorney, Agent, or Firm—Lyman R. Lyon

[57] ABSTRACT

A method for in situ rehabilitation of deteriorated underground piping featuring ease of installation.

6 Claims, 1 Drawing Sheet

U.S. Patent    Sep. 6, 1988    4,768,562
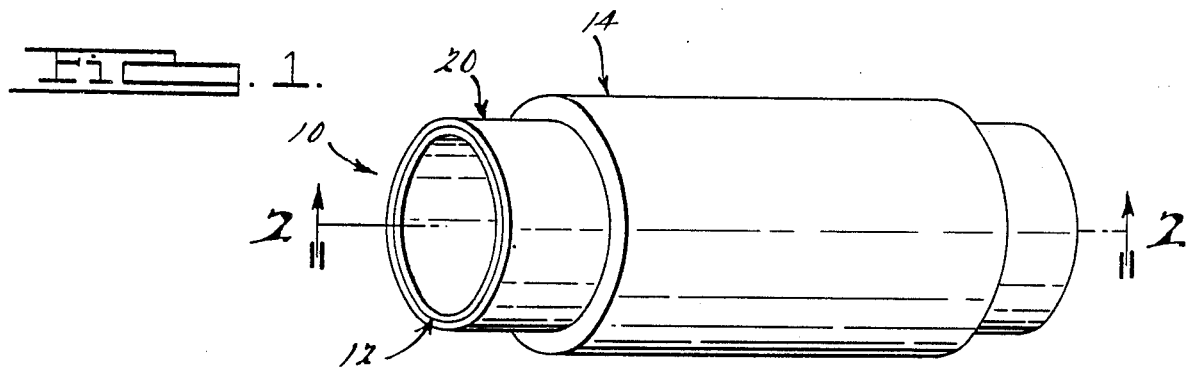
Fig. 1.
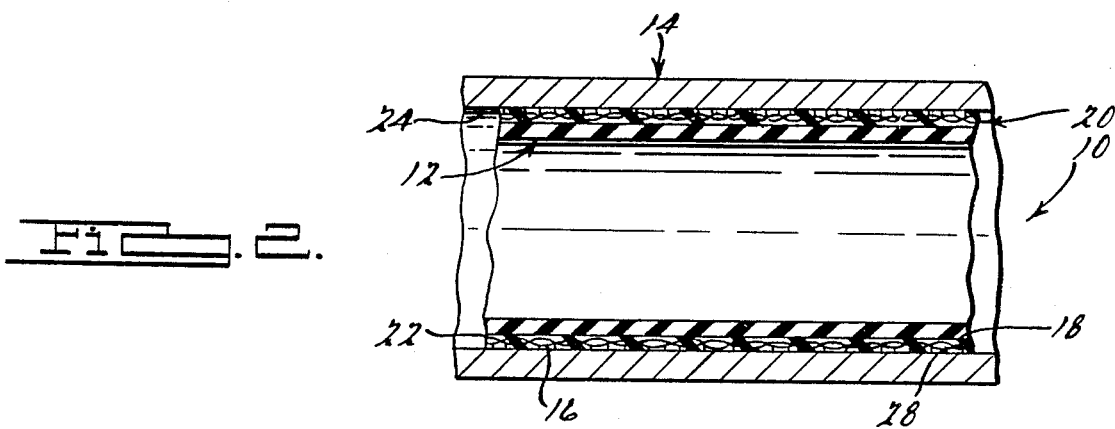
Fig. 2.
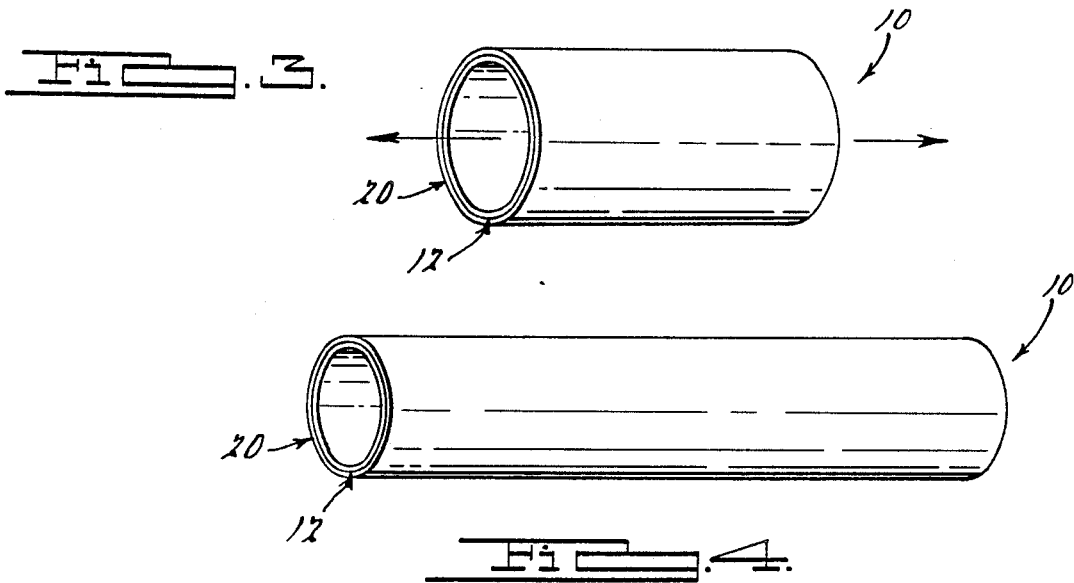
Fig. 3.
Fig. 4.

PIPE LINER

BACKGROUND OF THE INVENTION

The invention relates to the rehabilitation of deteriorated underground piping.

The prior art teaches several methods of sewer or pipeline rehabilitation, ranging from the excavation and replacement of the damaged pipe section to slip lining, i.e., the insertion of a second pipe of smaller diameter through the existing piping. However, excavation is costly, time consuming, and particularly impractical in congested urban areas, while the smaller pipe employed in slip lining appreciably reduces pipeline capacity.

A recent development in the art teaches a method of in situ pipe repair comprising the insertion therein of a pliable polyester felt sleeve whose inner surface is impregnated with a thermoset resin. The sleeve is inverted as it is advanced through the damaged pipe under hydrostatic pressure. The sleeve is thus turned inside-out, with its resin-impregnated inner surface pressing firmly against the inner walls of the damaged pipe. The water is then heated and recirculated for several hours, whereby the thermoset resin cures to form a new pipe within the original pipe.

Unfortunately, the inverted thermoset sleeve method necessitates procurement and subsequent heating of prodigious quantities of water. A prolonged curing period is also required, during which the pipeline must be removed from service. Further, the inversion technique is suitable for use with a limited range of pipe diameters and cannot accommodate more substantial and, hence, more rigid reinforcement fibres within the thermoset resin matrix.

SUMMARY OF THE INVENTION

The pipe liner of the instant invention comprises an elastomeric tube having an outer diameter substantially equal to the inner diameter of the damaged pipe and encompassed by an electrically conductive resinated fibre lattice that radially contracts when axailly elongated. The elastomeric tube and resinated fibre lattice are axially tensioned, whereby the maximum diameter of the liner is elastically reduced by the resultant elongation thereof. The resin is partially polymerized, whereafter the liner is substantially maintained in such axially elongated, reduced diameter condition by the resinated fibre lattice while remaining sufficiently flexible to permit the coiling thereof for storage and transportation, and to facilitate installation of the liner within the damaged pipe.

The elongated, reduced diameter liner is pulled through the section of damaged pipe to be rehabilitated, whereafter an electrical current is directed through the resinated fibre lattice therein. The partially polymerized resin is thus softened by electrical resistance heating. The elastomeric tube, no longer restrained by the resinated fibre lattice, resiliently expands radially outwardly, forcing the resinated fibre lattice into firm contact with the inner wall of the damaged pipe. The liner is further heated electrically so as to completely polymerize the resin, thereby bonding the liner to the inner wall of the damaged pipe and effecting repair thereof.

Where the inner wall of the damaged pipe is particularly rough or uneven, or where lubrication is deemed necessary to facilitate movement of the elongated liner therethrough, the outer surface of the fibre lattice is electrostatically flocked with short fibres prior to the impregnation thereof with the polymerizable resin, whereby the short fibres protrude radially outwardly from the resinated fibre lattice. The flocking serves to wick the resin from the fibre lattice to the inner wall of the damaged pipe upon contact therewith. The flocking additionally facilitates liner movement and installation by providing a slippery surface thereupon.

BRIEF DESCRIPTION OF THE DRAWINGS

FIG. 1 is a view in perspective of a section of damaged pipe lined with the pipe liner of the instant invention;

FIG. 2 is a partial longitudinal section of the lined pipe along line 2—2 of FIG. 1;

FIG. 3 is a view in perspective of a section of pipe liner prior to axial elongation and partial polymerization of the resin thereof; and FIG. 4 is a view in perspective of the liner section of FIG. 3 being maintained in axial elongation by the partially polymerized resin thereof.

DETAILED DESCRIPTION OF THE PREFERRED EMBODIMENT OF THE INVENTION

Referring to FIGS. 1 and 2, a pipe liner 10 constructed in accordance with the instant invention comprises an elastomeric tube 12 of conventional construction having an outer diameter substantially equal to the nominal inner diameter of the section of damaged pipe 14 to be rehabilitated; a reinforcement fibre lattice 16 which encompasses the tube 12 and is formed so as to radially contract when axially elongated; and a polymerizable resin 18, such as a thermoplastic or thermoset resin, which impregnates the fibre lattice 16. It is to be noted that the resultant resinated fibre lattice 20 is to be electrically conductive and, hence, comprises reinforcement fibres 22 formed of, or coated with, an electrically conductive material, or a polymerizable resin 18 formed of, or impregnated with, an electrically conductive material. For example, the electrically conductive resinated fibre lattice 20 may comprise a mixture of metallic fibres and non-conductive fibres impregnated with an electrically non-conductive thermoset resin.

The tube 12 and resinated fibre lattice 20 are then axially tensioned, whereby the maximum diameter of the tube 12 and lattice 20 are elastically reduced as both tube 12 and lattice 20 are axially elongated, as illustrated in FIGS. 3 and 4. The resin 18 of the resinated fibre lattice 20 is partially polymerized by heating or irradiation, whereafter the liner 10 is substantially maintained in such axially elongated, reduced diameter condition by the partially polymerized resinated fibre lattice 20.

It is to be noted that the resin 18 is polymerized only to the extent necessary to give the lattice 20 sufficient strength to counter the resilience of the elastomeric tube 12. For example, where the elastomeric tube 12 is formed of neoprene having a hardness of 90 Shore A, and the resinated fibre lattice 20 comprises metallized fibres impregnated with a thermoset resin, the thermoset resin is B-staged to a hardness of approximately 20 Shore D. Thus, the partially polymerized resinated fibre lattice 20, and, hence, the elongated liner 10, remains sufficiently flexible to permit the coiling of the liner 10 for storage and transportation, and to facilitate installation of the liner 10 within the damaged pipe section 14.

The axially elongated, reduced diameter liner 10 is inserted into position within the damaged pipe section 14, whereafter an electrical current is directed through the electrically conductive resinated fibre lattice 20. The resin 18 therein softens by electrical resistance heating, and the elastomeric tube 12, no longer restrained by the resinated fibre lattice 20, resiliently expands radially outwardly, forcing the resinated fibre lattice 20 into firm contact with the inner wall 24 of the damaged pipe section 14, as shown in FIG. 2. The liner 10 is further heated electrically so as to fully polymerize the resin 18, thereby bonding the liner 10 to the inner wall 24 of the damaged pipe section 14. The damaged pipe section 14 is thus concentrically lined with both the fully polymerized resinated fibre lattice 20 and the elastomeric tube 12. It is to be noted that the bonding of the lattice 20 to the inner wall 24 of the damaged pipe section 14 significantly increases the structural integrity of the rehabilitated pipe section.

Where the inner wall 24 of the damaged pipe section 14 is particularly rough or uneven, the outer surface 26 of the fibre lattice 16 is electrostatically flocked with short fibres 28, as shown in FIG. 2, thereby enabling the lattice 16 to be impregnated with a greater amount of polymerizable resin 18. Moreover, where the fibres 28 are permitted to protrude radially outwardly from the resinated fibre lattice 20, the protruding fibres 28 serve to wick the resin 18 from the resinated fibre lattice 20 to the inner wall 24 of the damaged pipe section 14 upon contact of the fibres 28 therewith. A more effective bond between the resinated fibre lattice 20 and the pipe's inner wall 24 is thus generated, particularly where the inner wall 24 is rough or uneven.

Additionally, since the protruding fibres 28 tend to bend during movement of the elongated liner 10, the bent fibres 28 effectively act as a lubricant to facilitate installation of the elongated liner 10 by generating an essentially slippery surface thereupon.

It is to be noted that, although the electrical resistance heating of an electrically conductive resinated fibre lattice 20 is utilized herein to effect softening and complete polymerization of the resin 18 therein subsequent to the insertion of the elongated liner 10 into the damaged pipe section 14, the instant invention contemplates the use of other polymerization means, including irradiation and other heating methods, as may be required by the particular resin employed therein.

While the preferred embodiment of the invention has been disclosed, it should be appreciated that the invention is susceptible of modification without departing from the spirit of the invention or the scope of the subjoined claims.

I claim:

1. A method of lining a damaged pipe section having an inner surface of nominal diameter comprising the steps of
    (a) forming a tubular reinforcement fibre lattice having an outer diameter substantially equal to the nominal inner diameter of said damaged pipe section;
    (b) impregnating said fibre lattice with a polymerizable resin;
    (c) forming an elastomeric tube internally of and in contiguity with said resinated fibre lattice;
    (d) axially tensioning said elastomeric tube and said resinated fibre lattice so as to elastically reduce the outer diameters thereof;
    (e) partially polymerizing the resin of said elongated resinated fibre lattice, whereby said lattice hardens sufficiently to maintain said elastomeric tube in such axially elongated condition;
    (f) inserting said elongated elastomeric tube and resinated fiber lattice within said damaged pipe section;
    (g) softening the partially polymerized resin of said elongated resinated fibre lattice, whereby said elastomeric tube resiliently expands radially outwardly to force said resinated fibre lattice into contiguity with the inner surface of said damaged pipe section; and
    (h) fully polymerizing the resin of said resinated fibre lattice, whereby said damaged pipe section is concentrically lined with said fully polymerized resinated fibre lattice and said elastomeric tube.

2. A method of lining a damaged pipe section having an inner surface of nominal diameter comprising the steps of
    (a) forming a tubular reinforcement fibre lattice having an outer diameter substantially equal to the nominal inner diameter of said damaged pipe section;
    (b) impregnating said fibre lattice with a polymerizable resin;
    (c) juxtaposing an elastomeric tube internally of said resinated fibre lattice;
    (d) axially tensioning said elastomeric tube and said resinated fibre lattice so as to elastically reduce the outer diameters thereof;
    (e) heating said elongated resinated fibre lattice to partially polymerize the resin therein and harden said elongated resinated fibre lattice sufficiently to maintain said elastomeric tube in such axially elongated condition;
    (f) inserting said elongated elastomeric tube and resinated fiber lattice within said damaged pipe section;
    (g) heating said elongated resinated fibre lattice, whereby the partially polymerized resin therein softens to permit resilient radial outward expansion of said elastomeric tube, such resilient tube expansion forcing said resinated fibre lattice into contiguity with the inner surface of said damaged pipe section; and
    (h) further heating said resinated fibre lattice to completely polymerize the resin therein, whereby said damaged pipe section is concentrically lined with said fully polymerized resinated fibre lattice and said elastomeric tube.

3. The method of claim 2 wherein forming a tubular reinforcement fibre lattice comprises the step of interweaving a plurality of reinforcement fibres.

4. The method of claim 2 wherein juxtaposing an elastomeric tube internally of said resinated fibre lattice comprises the step of forming said elastomeric tube of an elastomeric material while said material is in contiguity with said resinated fibre lattice.

5. The method of claim 2 wherein the heating of said resinated fibre lattice comprises the step of directing an electrical current through said resinated fibre lattice, said resinated fibre lattice being electrically conductive, whereby said resinated fibre lattice is heated by electrical resistance heating.

6. The method of claim 2 including the step of flocking said fibre lattice with minute fibres, whereby said minute fibres extend radially outwardly from said fibre lattice.

* * * * *